March 21, 1933.                    D. J. STEWART                    1,901,995
                         CONTROL FOR HEATING SYSTEMS
                    Filed Dec. 19, 1930           3 Sheets-Sheet 1
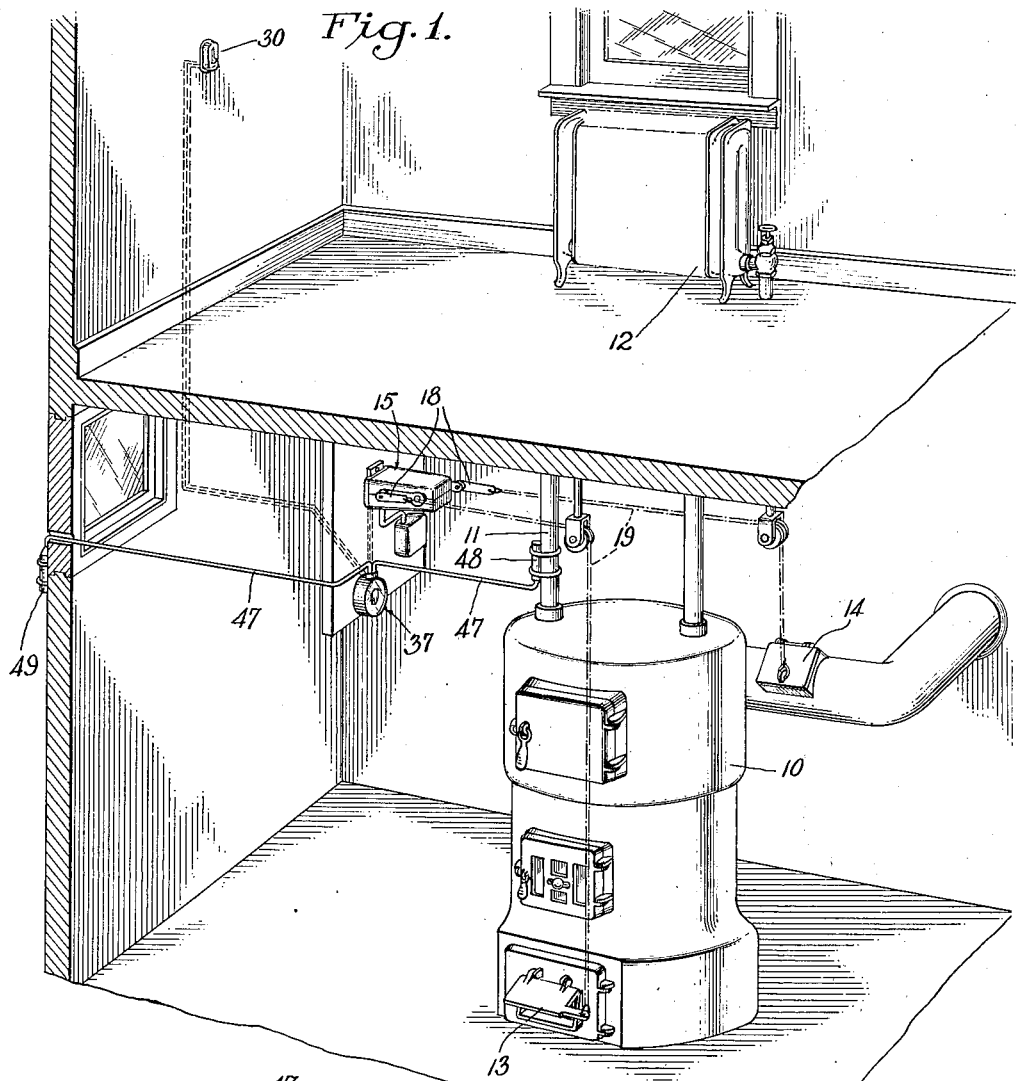
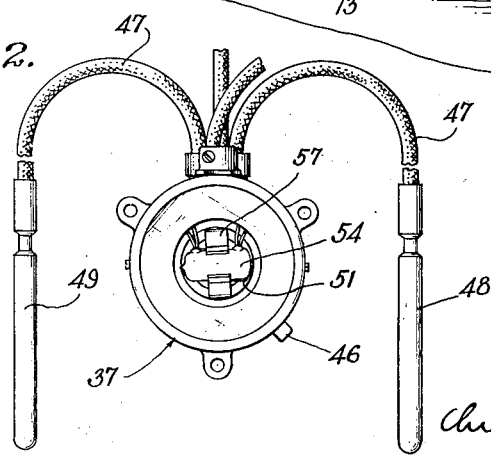
INVENTOR
Duncan J. Stewart
BY
Chindahl Parker & Carlson
ATTORNEYS March 21, 1933.                    D. J. STEWART                    1,901,995
                           CONTROL FOR HEATING SYSTEMS
                             Filed Dec. 19, 1930          3 Sheets-Sheet 2
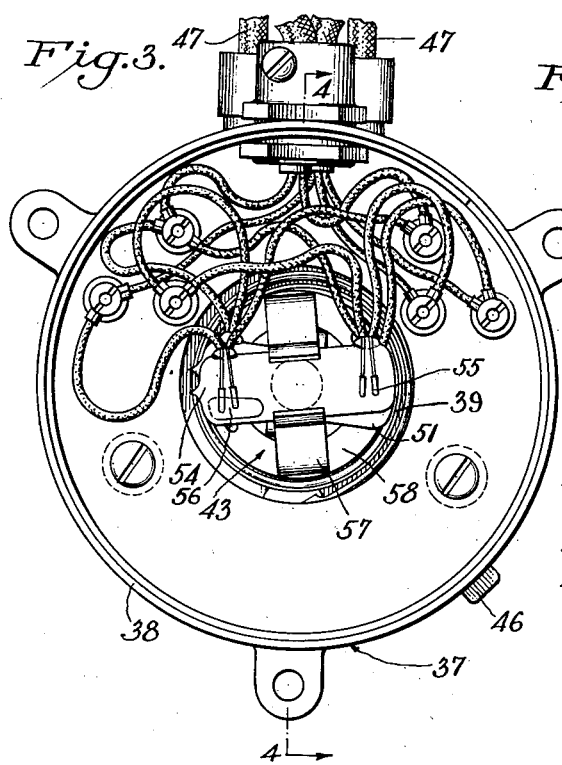
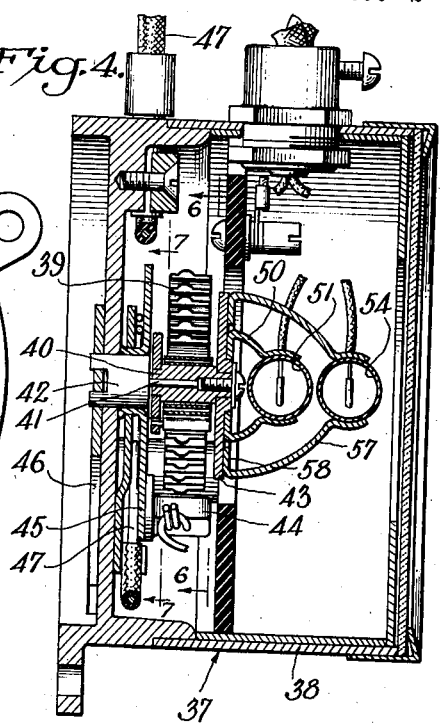
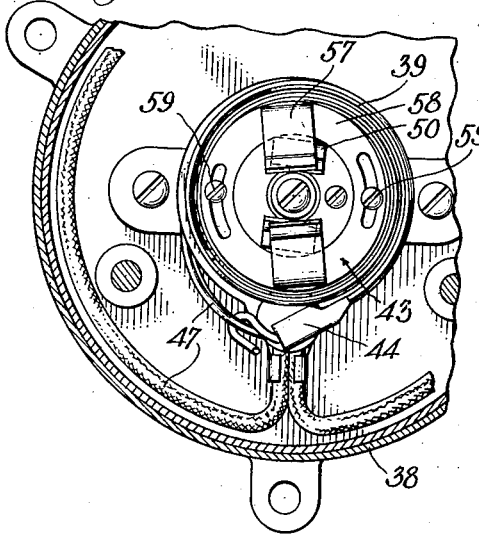
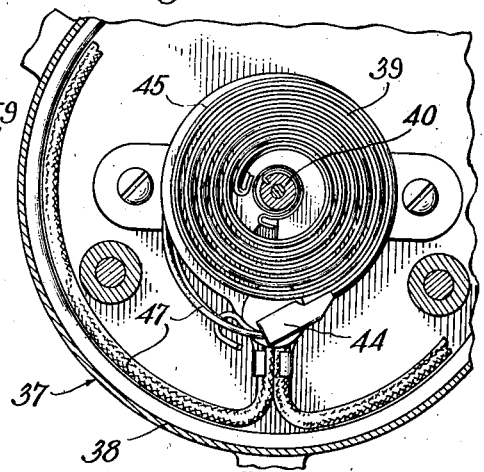
INVENTOR
Duncan J. Stewart.
BY
ATTORNEYS.

March 21, 1933.  D. J. STEWART  1,901,995
CONTROL FOR HEATING SYSTEMS
Filed Dec. 19, 1930   3 Sheets-Sheet 3
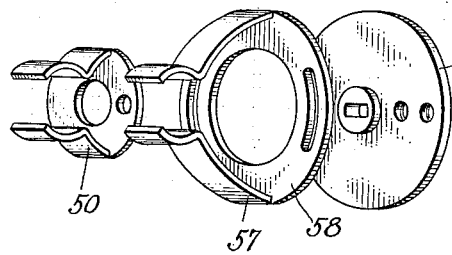
Fig. 8.
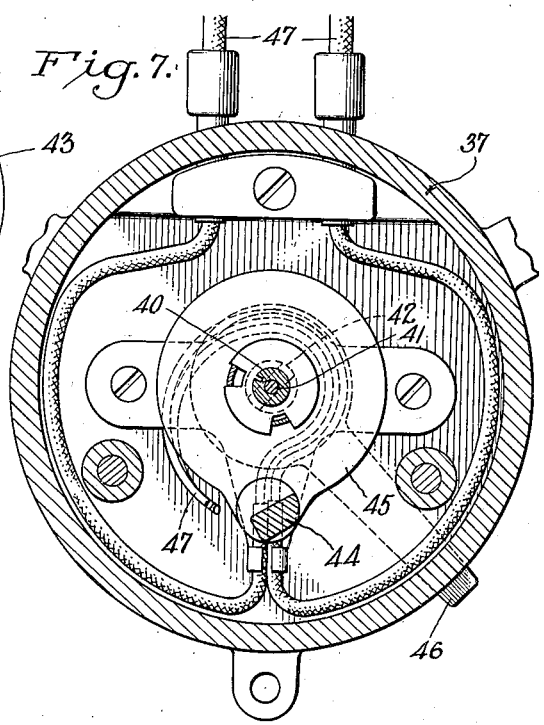
Fig. 7.
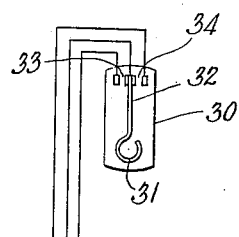
Fig. 9.
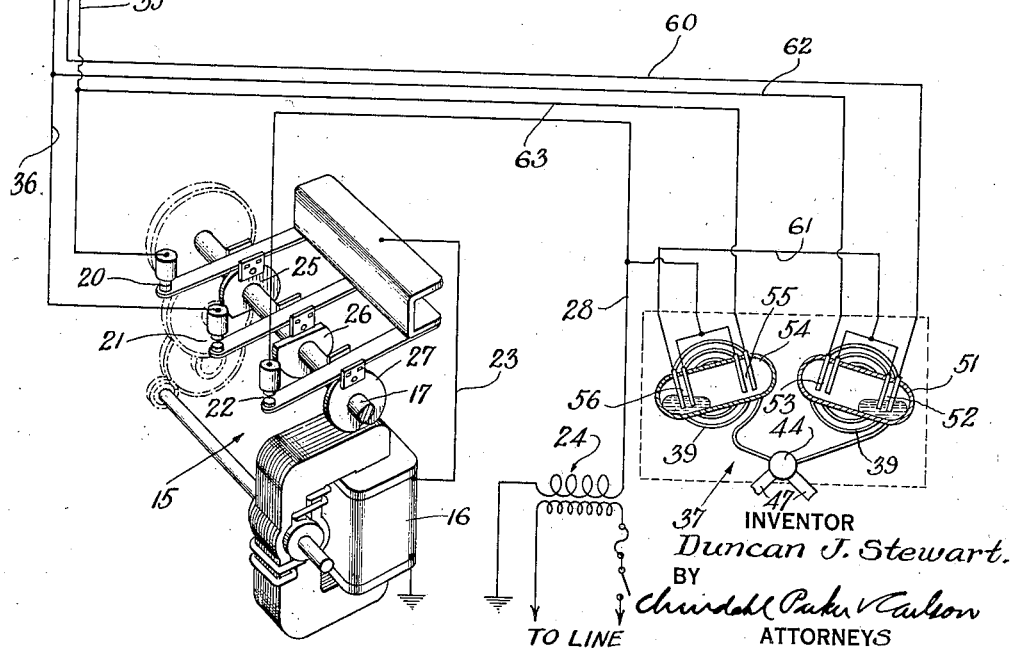
INVENTOR
Duncan J. Stewart.
BY
Churdahl Parker Carlson
ATTORNEYS Patented Mar. 21, 1933

1,901,995

UNITED STATES PATENT OFFICE

DUNCAN J. STEWART, OF ROCKFORD, ILLINOIS, ASSIGNOR TO HOWARD D. COLMAN, OF ROCKFORD, ILLINOIS

CONTROL FOR HEATING SYSTEMS

Application filed December 19, 1930. Serial No. 503,364.

This invention relates generally to control of heating systems for buildings and more particularly to the thermostatic regulation of the temperature at which the heating fluid used in the system is maintained.

In domestic heating systems, particularly those employing hot water as the heating fluid, it is desirable to provide for interruption of the burner operation when the fluid has reached a predetermined maximum temperature even though the controlling room thermostat continues to call for heat. Likewise, it is desirable to initiate burner operation independently of the room thermostat whenever the fluid falls below a lower temperature limit thereby avoiding the lag which would otherwise result when the room thermostat calls for heat after the burner has been idle for a long period. It is also desirable that the temperature at which the fluid is maintained be changed from time to time in order to insure heating of the rooms at a uniform rate under different weather conditions.

The general object of the present invention is to provide a new and improved method of and apparatus for the thermostatic control of a heating system capable of satisfying the requirements above set forth.

In carrying out this object, the invention contemplates the establishment of a predetermined range of variation for the fluid temperature within the system and the control of the primary source of heat, first, according to the demands on the system as determined by a room thermostat, second, according to the temperature of the fluid itself whereby to maintain the fluid temperature within said range, and third according to temperature changes outside of the building whereby said temperature range is shifted bodily with a change in the outside temperature and in a direction reverse to such change.

The invention also resides in the novel character of the means by which the primary heat source is regulated to maintain the temperature of the heating fluid within the established upper and lower limits in response to changes in the fluid temperature and to vary the fluid temperature within such limits under the control of a room thermostat.

Other objects and advantages of the invention will become apparent from the following detailed description taken in connection with the accompanying drawings, in which Figure 1 shows a fragment of a building equipped with a heat control system embodying the features of the present invention.

Fig. 2 is an elevational view of one of the controlling thermostats.

Fig. 3 is a view of the thermostat with the cover plate removed.

Fig. 4 is a sectional view taken along the line 4—4 of Fig. 3.

Fig. 5 is a view similar to Fig. 3 with the switches and leads thereto omitted.

Figs. 6 and 7 are sections taken respectively along the lines 6—6 and 7—7 of Fig. 4.

Fig. 8 shows the switch supporting elements of the thermostat in perspective.

Fig. 9 is a schematic view and wiring diagram.

In the exemplary form shown in the drawings, the invention is illustrated as a means for controlling the operation of a primary source of heat supply for a closed heating system by which fluid, preferably water, is heated in a boiler 10 and distributed from a main feed pipe 11 to radiators 12 located in different parts of the building to be heated. Herein the primary source of heat is a solid fuel burner whose operation may be interrupted and resumed in the usual way by regulating the positions of draft and check dampers 13 and 14. This may be accomplished through the medium of a power operator 15 of well-known construction which includes an electric motor 16 (Fig. 9) geared to a two-position shaft 17 having cranks 18 connected to the dampers by cables 19 and adapted in alternate half-revolutions of the shaft to open or close the draft damper and close and open the check damper.

Successive cycles of the damper operator are controlled in the usual way by three switches 20, 21 and 22 which have common terminals connected by a conductor 23 to one terminal of the motor winding, the other terminal of which is connected to a source 24 of current. The switch 20, the closure of which prepares a circuit for initiating the draft-opening cycle of the operator, is closed by a cam 25 in the approach of the shaft 17 to draft-closed position and is allowed to open as the shaft leaves this position. The switch 21 is operated in a similar way by a cam 26 to control the draft-closing cycle. The switch 22 is closed by a cam 27 in each cycle prior to the opening of the switch 20 or 21, and such closure completes a maintaining circuit for the motor, which circuit extends through a conductor 28 and is interrupted to terminate the cycle after a half-revolution of the shaft and the controlling cam 27.

As a means for determining the demands upon the system as a whole, a thermostat 30 is employed which is located at a representative or average point in the building. The thermostat is of well-known construction comprising a thermo-sensitive element 31 for actuating a tongue 32 which cooperates with two stationary contacts to form two switches 33 and 34 which are respectively connected by conductors 35 and 36 to the switches 20 and 21 of the damper operator. The switch 33 is closed as the temperature to which the thermostat is exposed falls below a value predetermined by the setting of the thermostat while the switch 34 is closed when the surrounding temperature exceeds said value.

The primary heat source is also under the control of another thermostat (Fig. 2) generally designated by the numeral 37 and arranged to respond to changes in the temperature of the heating fluid and also to changes in the outside temperature. In the present instance, this thermostat (Figs. 3 to 8) comprises a casing 38 enclosing a spirally wound Bourdon tube 39 with its closed inner end secured to a sleeve 40 loose on a pin 41 which is rigid with a stud 42 supported by the rear casing wall. The oscillatory movements of the sleeve 40, due to pressure changes within the tube 39, are communicated to a disk 43 rigid with the forward end of the sleeve.

The open end of the Bourdon tube, whose angular position is normally fixed, communicates with a housing 44 mounted on a disk 45 rigid with the stud 42 and adapted to be turned to change the setting of the thermostat as a whole through the medium of an arm 46 connected to the stud 42 and projecting radially from the casing.

The housing 44 communicates with two capillary tubes 47 which transmit to the Bourdon tube pressure changes resulting from temperature changes detected by bulbs 48 and 49. The bulb 48 is associated with the boiler feed pipe 11 and therefore at all times responds to the temperature of the fluid being delivered to the distributing system. The bulb 49 is disposed outside of the building. Since the Bourdon tube communicates with both of the bulbs 48 and 49, changes in the temperature to which the bulbs are exposed produce cumulative effects upon the position of the oscillatory disk 43. Thus a given decrease in either temperature causes a corresponding clockwise movement of the disk while a temperature increase moves the disk counter-clockwise. Opposite changes in the two temperatures tend to neutralize each other, the disk being moved in direction and extent a distance corresponding to the net change.

Rigidly mounted upon the disk 43 is a bracket 50 having forwardly projecting spring clamping arms which support a closed tube 51 for tilting movement about the pivotal axis of the disk. This tube contains a globule of mercury which cooperates with pairs of contacts at opposite ends of the tube to form switches 52 and 53 one of which is closed when the other is open. For any given temperature outside of the building, the switch 52 remains closed when the temperature of the heating fluid is below a predetermined value and is opened when the fluid temperature rises above such value. It will also be seen, that this temperature, hereinafter referred to as the maximum limit value, is determined by the existing outside temperature, decreasing as the outside temperature rises because under an increased outside temperature, the same pressure will be produced in the Bourdon tube by a lower fluid temperature. Likewise a lower outside temperature will require a higher fluid temperature in order to close the switch 53, the result being that the fluid temperature to which the switches 52 and 53 respond is varied automatically with but inversely proportional to outside temperature changes.

A second mercury tube 54 providing switches 55 and 56 is mounted in front of the tube 51 on spring arms 57 rigid with and projecting forwardly from a ring 58 which is secured against the disk 43 by screws 59 entered through slots which permit the tube to be adjusted angularly with respect to the tube 51. The tube 54 is set at an angle relative to the tube 51 so that its switches 56 and 55 will be closed respectively when the fluid temperature rises above and falls below a value lower than said maximum value and hereafter referred to as the minimum temperature limit of the heating fluid. This value varies with the outside temperature changes in the same manner as the maximum temperature above referred to so that a fixed temperature differential exists between the two limits for all temperatures of the outside air. The difference between the upper and lower fluid limiting temperatures is, of course, determined by the angular relation of the tubes 51 and 54 which may be varied as desired.

The two switches 52 and 56 are utilized to render the room thermostat operative in controlling the burner only when the temperature of the fluid within the system is between the existing upper and lower limits. For this purpose, the parallel circuits through the thermostat switches 33 and 34 have a common branch which extends from the common or tongue contact of the thermostat 30 through a conductor 60, the switch 52, a conductor 61, the switch 56 to the power conductor 28. With this arrangement, the damper operator cannot be started by closure of either of the room thermostat switches 33 and 34 so long as either of the switches 52 and 56 of the thermostat 37 remains open.

In order to prevent the fluid in the system from being heated excessively, that is above the established maximum temperature limit, the switch 53 is arranged to initiate a closing cycle of the damper operator whenever the fluid temperature exceeds the maximum limit. To this end, the terminals of this switch are connected respectively to the conductor 61 and a conductor 62 leading to the conductor 36 so that closure of the switch 53 will establish a short circuit around the thermostat switch 34 and initiate a draft-closing cycle of the damper operator independently of the thermostat 30.

In a similar way, the thermostat switch 33 is arranged to be short-circuited by closure of the switch 55 so as to open the draft and start the fuel burner independently of the thermostat whenever the fluid temperature falls below the established minimum limit. Thus, the terminals of the switch 55 are connected to the conductor 28 and a conductor 63 leading to the conductor 35.

*Operation*

Assuming that the fluid in the distributing system is within the upper and lower limits established by the existing outside temperature and that the draft door 13 is closed, the parts would be positioned as shown in Fig. 9 and the control would operate as follows. While the burner thus remains idle, the fluid cools and its temperature may eventually fall below the established minimum limit. In this event, the decrease in pressure within the Bourdon tube causes switch 56 to be opened and switch 55 to be closed, completing a circuit from the power source 24 through conductor 28, switch 55, conductors 63 and 35, switch 20, to the motor winding. The operator would execute a cycle and stop with the draft door in open position because the circuit controlling the draft-closing cycle, which might otherwise be closed by the thermostat switch 34, would be held open by the switch 56.

The burner will continue in operation until the fluid has been heated above the lower temperature limit whereupon the switch 55 will be opened and switch 56 closed. If the thermostat switch 34 is still closed, as will be the case if the room thermostat still ceases to call for heat, a circuit will be completed from the power source through conductor 28, switch 56, conductor 61, switch 52, conductor 60, switch 34, conductor 36, and switch 21 to the motor winding. This initiates operation of the motor to close the draft door.

On the other hand, the room temperature may have fallen below that for which the room thermostat is set while the burner was under the control of the low limit switch 55. In this event, the only effect of closing switch 56 and opening switch 55, is to restore the control of the primary heat source to the room thermostat. Thus, the burner will continue in operation after the minimum fluid temperature has been reached and until the proper room temperature has been attained whereupon the draft will be closed by completion of the circuit above traced.

In the event that the fluid temperature rises above its maximum limit before the required room temperature has been attained, the switch 52 becomes opened and the switch 53 closed. This establishes a circuit from the power source through conductor 28, switch 56, conductor 61, switch 53, conductors 62 and 36, switch 21, to the motor winding causing the damper operator to execute a cycle during which the burner operation is interrupted. Immediate execution of a draft-opening cycle under the control of the then closed thermostat switch 33 is prevented by the open switch 52.

From the foregoing, it will be apparent that the primary heat source is within the control of the room thermostat only when the fluid temperature prevailing in the boiler is within the range predetermined by the existing outside temperature. When the fluid temperature rises above or falls below this established range, the fuel burner is governed exclusively by the thermostat 37.

I claim as my invention:

1. In combination with a system for distributing heating fluid, a fuel burner for heating said fluid, electromagnetic means controlling the operation of said burner, a thermostat responsive to temperature changes within the building to be heated and having switching means, two mercury tubes each having switches at opposite ends respectively closed upon tilting of the tube in opposite directions relative to a horizontal position, a thermo-sensitive element arranged to tilt said tubes in opposite directions as the temperature of said fluid rises and falls, said tubes being inclined relative to each other so that one of said switches will be opened and closed and a second switch will be closed and opened respectively as the fluid temperature rises above and falls below a minimum limit, a third switch being opened and closed and the fourth switch being closed and opened respectively as the fluid temperature rises above and falls below a maximum limit, a circuit controlling said electromagnetic means including said switching means and said second and third switches, a circuit including said first switch and controlling said electromagnetic means to initiate burner operation independently of said thermostat, and a circuit controlling said electromagnetic means to interrupt operation of the burner and arranged to be completed by closure of said fourth switch.

2. In combination with a system for distributing heating fluid, a fuel burner for heating said fluid, an electromagnetic operator adapted to execute successive cycles to initiate and interrupt the operation of said burner, a thermostat responsive to temperature changes within the building to be heated and having two switches adapted to be closed alternately to initiate successive cycles of said operator, a second thermostat having two switches connected in series relation and common to both of the circuits controlled by said first-mentioned switches, said second thermostat being responsive to the temperature of said fluid and acting to open one of its switches when the fluid temperature exceeds a maximum limit or falls below a minimum limit, a third switch adapted to be closed by said second thermostat upon a fall in fluid temperature below said minimum limit and acting when closed to control said operator and initiate burner operation independently of said first thermostat, and a fourth switch adapted to be closed by said second thermostat to cause said operator to interrupt the burner operation independently of the first thermostat when the fluid temperature exceeds said maximum limit.

3. In combination with a system for distributing heating fluid, a fuel burner for heating said fluid, electromagnetic means controlling the operation of said burner, a thermostat responsive to temperature changes within the building to be heated and having switching means, a thermo-sensitive element responsive to temperature changes of the heating fluid, an energizing circuit for said electromagnetic means including said switching means and two switches arranged in series relation, both of said switches being maintained closed by said thermo-sensitive element only when the fluid temperature is above a minimum limit and below a maximum limit, a circuit for energizing said electromagnetic means independently of said thermostat including a switch arranged to be closed by said element when the fluid temperature falls below said minimum limit, and a circuit controlling the energization of said electromagnetic means and arranged to be closed by said thermo-sensitive element when the fluid temperature exceeds said maximum limit.

4. In combination with a system for distributing heating fluid, a fuel burner for heating said fluid, electromagnetic means controlling the operation of said burner, a thermostat having a switch adapted to be closed when the temperature within the building to be heated falls below a predetermined value, a second thermostat responsive to the temperature of said fluid and having a switch which is normally closed when the fluid temperature is below a predetermined maximum value and opened when the fluid rises above such value, a circuit for energizing said electromagnetic means to initiate operation of said burner including both of said switches, and a second energizing circuit for initiating operation of said burner independently of said first mentioned thermostat including a switch adapted to be closed by said second thermostat at a predetermined fluid temperature lower than said maximum value.

5. In combination with a system for distributing heating fluid, a fuel burner for heating said fluid, a thermostat arranged to interrupt and resume operation of said burner when the temperature within the building to be heated rises above or falls below a predetermined value, a second thermostat responsive to the temperature of the heating fluid and arranged to render said first mentioned thermostat ineffectual and simultaneously interrupt operation of the burner independently of said first thermostat when the fluid temperature exceeds a predetermined maximum value and to render said first mentioned thermostat ineffectual and simultaneously initiate burner operation when the fluid temperature falls below a predetermined minimum value, and means controlled by said second thermostat and acting to render said first thermostat ineffectual as regards the control of said burner when the fluid temperature is above said maximum value or below said minimum value.

6. In combination with a system for distributing heating fluid, a fuel burner for heating said fluid, a thermostatic switch regulating the operation of said burner according to the demands of the building, an oscillatory member supporting two mercury tubes inclined at an angle relative to each other, a thermo-sensitive element arranged to shift said member in opposite directions as the temperature of said fluid rises and falls, a switch in one of said tubes which is closed and opened depending on whether the fluid temperature is above or below a predetermined maximum limit, said last mentioned switch preventing burner operation when the fluid is above said maximum limit, a switch in the other of said tubes adapted independently of said thermostatic switch to initiate operation of the burner when the fluid temperature falls below a predetermined minimum limit, and a second thermo-sensitive element acting to shift said member in a direction to increase said maximum and minimum limits when the outside of the building decreases and to decrease both of the values when the outside temperature increases.

7. For controlling the fluid temperature in the heating system of a building, a thermostat comprising a thermo-sensitive element responsive to changes in the temperature of the heating fluid, a pair of switches actuated by said element and closed respectively when the fluid temperature is above and below a maximum value, a second pair of switches also actuated by said element and closed respectively when the fluid temperature is above and below a higher maximum temperature, and a second thermo-sensitive element responsive to temperature changes outside of the building and acting to vary said maximum and minimum temperatures inversely proportional to the outside temperature changes.

In testimony whereof, I have hereunto affixed my signature.

DUNCAN J. STEWART.